(12) United States Patent
Sato

(10) Patent No.: US 9,010,937 B2
(45) Date of Patent: Apr. 21, 2015

(54) LIGHT SOURCE APPARATUS AND IMAGE PROJECTION APPARATUS

(71) Applicant: Osamu Sato, Kanagawa (JP)

(72) Inventor: Osamu Sato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 19 days.

(21) Appl. No.: 13/904,521

(22) Filed: May 29, 2013

(65) Prior Publication Data

US 2014/0009692 A1    Jan. 9, 2014

(30) Foreign Application Priority Data

Jul. 5, 2012  (JP) .................................. 2012-151641

(51) Int. Cl.
*G03B 21/14*   (2006.01)
*F21K 99/00*   (2010.01)
*H04N 5/74*    (2006.01)
*H04N 9/31*    (2006.01)

(52) U.S. Cl.
CPC .. *F21K 9/00* (2013.01); *H04N 5/74* (2013.01); *H04N 5/7416* (2013.01); *H04N 9/31* (2013.01)

(58) Field of Classification Search
USPC ........ 353/30, 31, 33, 34, 37, 94; 362/84, 293; 349/5, 7, 8
See application file for complete search history.

(56) References Cited

U.S. PATENT DOCUMENTS

| | | | |
|---|---|---|---|
| 7,159,987 B2 * | 1/2007 | Sakata | 353/31 |
| 7,905,605 B2 * | 3/2011 | Bierhuizen et al. | 353/31 |
| 8,126,025 B2 * | 2/2012 | Takeda | 372/50.12 |
| 8,414,146 B2 * | 4/2013 | Kiser | 362/231 |
| 8,708,499 B2 * | 4/2014 | Katou | 353/20 |
| 2008/0291672 A1 * | 11/2008 | Hsu et al. | 362/231 |
| 2009/0073687 A1 | 3/2009 | Kiser | |
| 2012/0112216 A1 * | 5/2012 | Kiser | 257/89 |
| 2013/0100639 A1 * | 4/2013 | Li et al. | 362/84 |

FOREIGN PATENT DOCUMENTS

| | | |
|---|---|---|
| CN | 101006392 A | 7/2007 |
| CN | 102520571 A | 6/2012 |
| EP | 1 830 225 A1 | 9/2007 |
| JP | 2001-092014 | 4/2001 |
| JP | 2004-289368 | 10/2004 |

(Continued)

OTHER PUBLICATIONS

Extended European Search Report issued Aug. 19, 2014 in Patent Application No. 13171539.3.

(Continued)

*Primary Examiner* — William C Dowling
(74) *Attorney, Agent, or Firm* — Oblon, McClelland, Maier & Neustadt, L.L.P.

(57) ABSTRACT

A light source apparatus includes a red light emitting device to emit red light; a green light emitting device to emit green light; a blue light emitting device to emit blue light, each of the red light emitting device, the green light emitting device, and the blue light emitting device disposed separately from any other. Among the red light emitting device, the green light emitting device and the blue light emitting device, at least two light emitting devices each includes a first light source and a second light source, the first light source emitting light having a wavelength of a light of a primary color, and the second light source emitting light having a wavelength deviated from the wavelength of the light of the primary color.

2 Claims, 4 Drawing Sheets

(56) References Cited

FOREIGN PATENT DOCUMENTS

| JP | 2011-237614 A | 11/2011 |
| JP | 2012-008549 | 1/2012 |

OTHER PUBLICATIONS

Office Action issued Dec. 23, 2014 in Chinese Patent Application No. 201310261089.2.

* cited by examiner

LIGHT SOURCE APPARATUS AND IMAGE PROJECTION APPARATUS

CROSS-REFERENCE TO RELATED APPLICATION

This application claims priority pursuant to 35 U.S.C. §119 to Japanese Patent Application No. 2012-151641, filed on Jul. 5, 2012 in the Japan Patent Office, the disclosure of which is incorporated by reference herein in its entirety.

BACKGROUND

1. Technical Field

The present invention generally relates to a light source apparatus having separate light emitting devices for red light, green light, and blue light, and an image projection apparatus employing the light source apparatus.

2. Background Art

Image projection apparatuses include various types of projectors such as a digital light processing (DLP: registered trademark) projector, a liquid crystal display (LCD) projector, and so on. The projector may use a discharge lamp such as a high-pressure mercury vapor lamp as a light source, but a semiconductor light source or a solid-state light source such as a light emitting diode (LED) or a laser diode (LD) has been developed and can be used instead of the discharge lamp. For example, JP-2012-008549-A discloses an image display apparatus employing an LED as the light source. The light intensity of the semiconductor light sources has been enhanced compared to the previous types of semiconductor light sources. Further, the semiconductor light sources have environmentally preferable features such as mercury-free construction and low power consumption.

The high-pressure mercury vapor lamp has a specific emission spectrum characteristic such that the blue (B) component is strong while the green (G) and red (R) components are weak, by which the lamp emits light with a specific color reproduction performance. The Commission Internationale de l'Eclairage (CIE) defines an international color system such as CIE-XYZ color system, such that the color coordinates can be set in the xy chromaticity diagram, and sRGB (standard RGB) is used as the international Standard, in which a color triangle is defined by connecting the tops of R, G and B defined by sRGB.

Compared to the color triangle of sRGB, the green light of the high-pressure mercury vapor lamp is shifted toward yellowish green, and the red light of the high-pressure mercury vapor lamp is shifted toward vermilion, as shown in FIG. 6. Therefore, to secure the intensity of green light and red light for the projector using the high-pressure mercury vapor lamp, a light having a wavelength deviated from the wavelength of the primary colors defined by sRGB standard is used as primary color light. As a consequence, however, the color reproduction performance of the projector using the high-pressure mercury vapor lamp deteriorates.

In contrast, projectors employing the semiconductor light sources can use separate red, green, and blue light sources, and each of the light sources can be configured to emit a light beam having a specific wavelength. Therefore, compared to projectors using a high-pressure mercury vapor lamp as the light source, the wavelengths of light beams emitted from each of the light source, used as the primary color, can be more closely matched to the wavelength of the primary color light as defined by sRGB standard. Therefore, a color triangle of the semiconductor light sources on the color coordinates of the xy chromaticity diagram can be set closer to the sRGB standard color triangle, thereby improving color reproduction performance and enlarging a color reproduction area. For this reason, the light sources for projectors may be changed from the high-pressure mercury vapor lamp to the semiconductor light source in the future. It should be noted that herein the term "primary colors" mean colors that become the sources of all colors, wherein the primary colors of light are red (R), green (G), and blue (B) light, and almost any color can be reproduced using some combination of the three primary colors.

As for the projectors using the semiconductor light sources, the color triangle defined by the wavelength of each of the light sources used as the primary colors can be set close to the color triangle of sRGB standard on the color coordinates, thereby providing color reproduction performance superior to projectors using the above-mentioned discharge lamp such as the high-pressure mercury vapor lamp. However, the color reproduction performance of non-primary colors generated by a combination of light of each of the light sources may not always be satisfactory.

In JP-2012-008549-A, for example, two light sources are used for the blue light, in which one light source such as a semiconductor laser emits a first blue light, and another light source such as a blue light generator emits a second blue light. The first blue light of the semiconductor laser has a wavelength of 450 nm or less, which is a monochromatic light having a relatively violet tone. The second blue light generated by the blue light generator is combined with the first blue light to broaden a wavelength range of the blue light to a long wavelength side so that color rendering property of the blue light can be enhanced.

However, in the configuration of JP-2012-008549-A, the color reproduction performance of non-primary color may not be satisfactory, in particular for Ye (yellow) color. The color rendering property means a property of light of the light source that affects the color appearance of an object when the light emitted from the light source apparatus irradiates the object. Specifically, if the color appearance of the object irradiated by a specific light is close to the object's natural appearance in sunlight (reference light), the color rendering is said to be good, and if the color appearance of the object using the specific light is not natural, the color rendering is said to be not good.

SUMMARY

In one aspect of the present invention, a light source apparatus is devised. The light source apparatus includes a red light emitting device to emit red light; a green light emitting device to emit green light; a blue light emitting device to emit blue light, each of the red light emitting device, the green light emitting device, and the blue light emitting device disposed separately from any other. Among the red light emitting device, the green light emitting device and the blue light emitting device, at least each of two light emitting devices including a first light source and a second light source, the first light source emitting a light having a wavelength of a primary color, and the second light source emitting light having a wavelength deviated from the wavelength of the light of the primary color.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
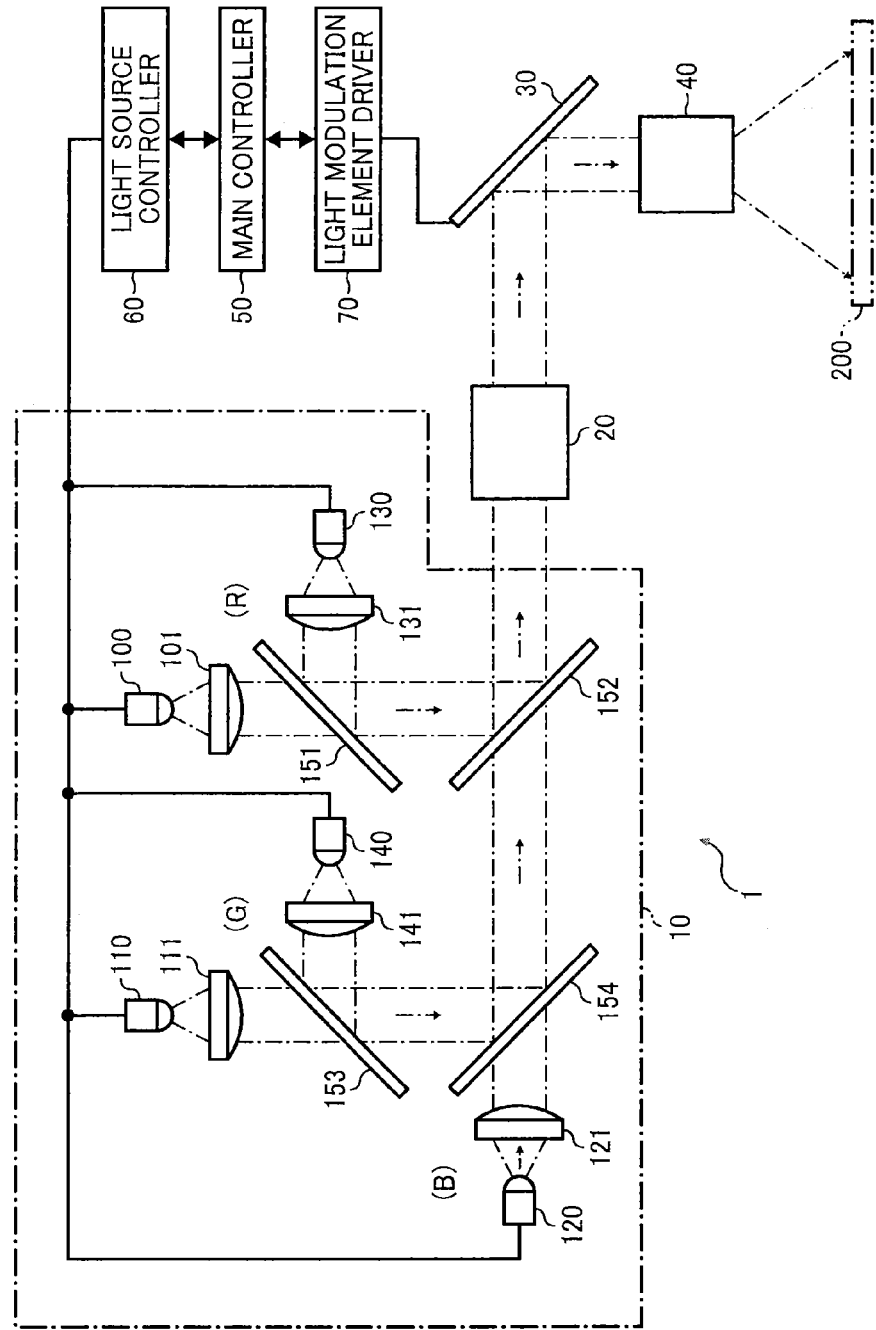
FIG. 1 is a schematic configuration of a light source apparatus and an image projection apparatus according to an example embodiment of the present invention

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that, have a similar function, operate in a similar manner, and achieve a similar result. Referring now to the drawings, apparatuses or systems according to example embodiments of the present invention are described hereinafter.

A description is given of a light source apparatus and an image projection apparatus including the light source apparatus according to an example embodiment of the present invention with reference to the drawings. FIG. 1 is a schematic configuration of a light source apparatus and an image projection apparatus 1 using the light source apparatus according to an example embodiment of the present invention. The image projection apparatus 1 may be, for example, a digital light processing (DLP: registered trademark) projector. As illustrated in FIG. 1, the image projection apparatus 1 includes, for example, a light source apparatus 10, a relay lens 20, a light modulation element 30, a projection lens 40, a main controller 50, a light source controller 60, and a light modulation element driver 70.

The light modulation element 30 is, for example, a reflection type light modulation element including a large number of micro mirrors arranged on a plane. The projection lens 40, used as a projection optical system, projects images onto the screen 200. The main controller 50 controls the image projection apparatus 1 as a whole. The light source controller 60 controls each LED light source of the light source apparatus 10. The light modulation element driver 70 controls the micro mirrors of the light modulation element 30. In this disclosure, the light modulation element 30 employs a semiconductor device known as a digital micro-minor device (DMD: registered trademark) having a large number of micro mirrors arranged in a matrix to be radiated by the light coming from the light source, and an angle of the light reflection face of each of the micro mirrors can be controlled. The light modulation element 30 is not limited to the DMD, but other devices such as a pass-through or reflection type liquid crystal micro display can be used.

The light source apparatus 10 includes, for example, a red light emitting device that emits red (R) light, a green light emitting device that emits green (G) light, and a blue light emitting device that emits blue (B) light, wherein the red light emitting device, the green light emitting device, and the blue light emitting device are independent light emitting device with each other. Each of the light emitting devices includes, for example, a first light source employing a semiconductor light source such as a light emitting diode (LED) that can respectively emit the light of three primary colors of R(red), G(green), and B(blue) having the substantially same wavelength of the corresponding three primary colors of sRGB standard.

For example, the red light emitting device includes a first red LED 100 as the first light source of the red light emitting device, the green light emitting device includes a first green LED 110 as the first light source of the green light emitting device, and the blue light emitting device includes a first blue LED 120 as the first light source of the blue light emitting device. Further, among the three light emitting devices, for example, the red light emitting device includes a second light source using the semiconductor light source such as LED, and the green light emitting device further includes a second light source using the semiconductor light source such as LED. For example, the red light emitting device includes a second red LED 130 as the second light source of the red light emitting device that emits a light having a wavelength deviated from the wavelength of the light of primary color emitted from the first red LED 100. Further, the green light emitting device includes a second green LED 140 as the second light source of the green light emitting device that emits a light having a wavelength deviated from the wavelength of the light of the primary color emitted from the first green LED 110. In this configuration, the deviation of wavelength of light emittable from the second light source from the wavelength of the light emittable from the first light source (i.e. primary color light) is, for example, in a range of 1 nm to 20 nm, and preferably 10 nm to 15 nm. Although FIG. 1 shows a configuration that the blue light emitting device does not include the second light source, the blue light emitting device can include a second light source.

The light source apparatus 10 further includes collimator lenses 101, 111, 121, 131, 141 and dichroic mirrors 151 to 154. Each of the collimator lenses 101, 111, 121, 131, 141 collimates the light emitted from each of the LEDs 100, 110, 120, 130, 140 as a parallel light beam. Each of the dichroic mirrors 151 to 154 reflects a light having a specific wavelength and passes through a light having other wavelength.

In the light source apparatus 10, the red light emitted from the first red LED 100 is collimated by the collimator lens 101, passes through the dichroic mirror 151, and is then reflected by the dichroic mirror 152. Further, the green light emitted from the first green LED 110 is collimated by the collimator lens 111, passes through the dichroic mirror 153, and is then reflected by the dichroic mirror 154. Further, the blue light emitted from the first blue LED 120 is collimated by the collimator lens 121, and passes through the dichroic mirrors 154 and 152.

The second red LED 130 emits a red light (e.g., 624 nm) deviated from the wavelength of the first red LED 100 (e.g., 636 nm), which is shifted toward green color. The red light emitted from the second red LED 130 is collimated by the collimator lens 131, and reflected by the dichroic mirrors 151 and 152. Further, the second green LED 140 emits a green light (e.g., 577 nm) deviated from the wavelength of the first green LED 110 (565 nm), which is shifted toward red color. The green light emitted from the second green LED 140 is collimated by the collimator lens 141, and reflected by the dichroic mirrors 153 and 154.

As for the light source apparatus 10, the lights emitted from the LED light sources are synthesized as a synthesized light, and the synthesized light irradiates the light modulation element 30 through the relay lens 20. For example, the light modulation element 30 has micro-mirror matrix such as several tens of μm-sized mirrors arranged in a matrix pattern of 480,000 minors to 207 million mirrors. The light modulation element driver 70 drives each of the micro minors using drive signals to control the light reflection for each of display pixels to project a full color image. The full color image generated by the light modulation element 30 is enlarged and projected onto the screen 200 via the projection lens 40.

Figure 2:
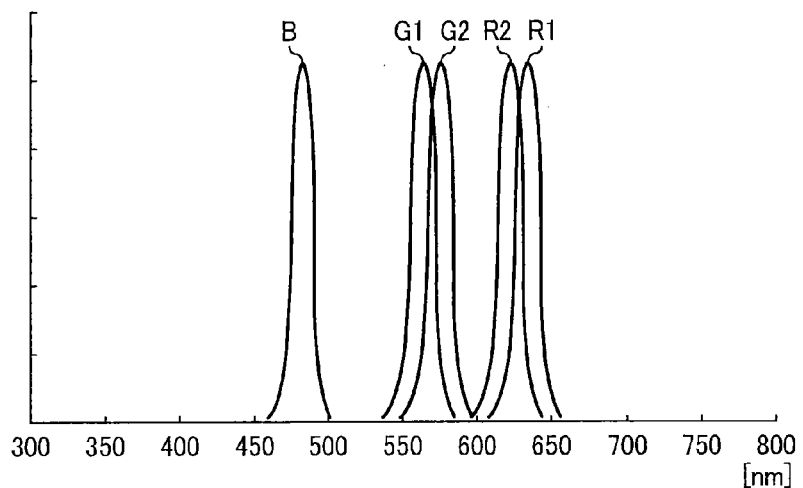
FIG. 2 shows example profiles of emission spectrum of light emitted from each LED of the light source apparatus of FIG. 1.
Figure 3:
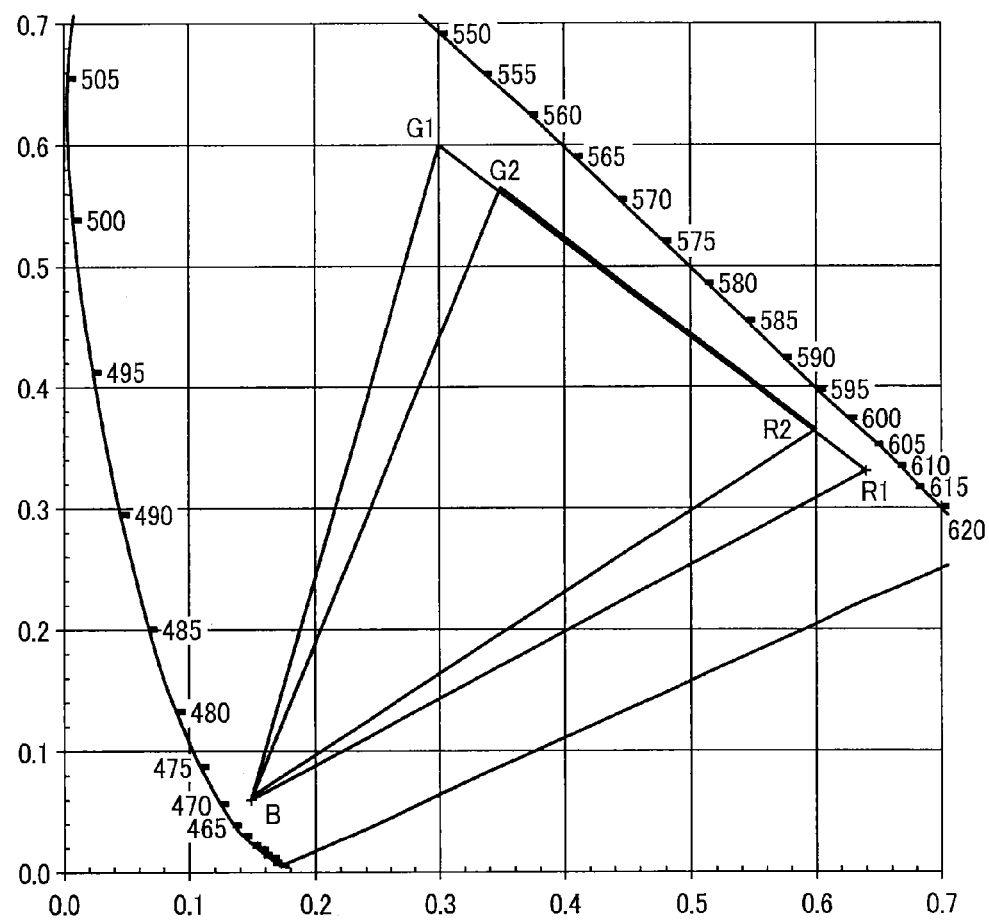
FIG. 3 shows color coordinates of light having the emission spectrum shown in FIG. 2 plotted on the xy chromaticity diagram of CIE-XYZ color system.

FIG. 2 shows example emission spectrum of light emitted from each LED light source of the light source apparatus 10. FIG. 3 shows color coordinates of the emission spectrum shown in FIG. 2 plotted on the xy chromaticity diagram of CIE-XYZ color system defined as international color system by Commission Internationale de l'Eclairage (CIE). For example, in FIGS. 2 and 3, R1 is the main wavelength of the first red LED 100, R2 is the main wavelength of the second red LED 130, G1 is the main wavelength of the first green LED 110, G2 is the main wavelength of the second green LED 140, and B is the main wavelength of the first blue LED 120.

The spectral characteristics of R1, G1 and B in FIG. 2 can be expressed as a color triangle shown in FIG. 3, in which coordinates corresponding to R1, G1 and B are plotted as the tops of the color triangle. The color triangle of R1, G1 and B is substantially matched to the color triangle of sRGB standard, which means the coordinates corresponding to R1, G1 and B are substantially matched to coordinates of the three primary colors of sRGB standard. However, the color reproduction performance of non-primary color may not be good enough using only the R1, G1 and B. For example, when Ye (yellow), which is a color between R1 and G1, is to be generated and displayed, because Ye (yellow) light component is not included in the light sources, the Ye (yellow) light is generated by synthesizing the light of R1 and G1. However, the color reproduction performance of Ye (yellow) generated by synthesizing the light of R1 and G1 may not be good enough, which means the color reproduction performance of non-primary color may not be good enough.

Based on the research of the inventor, it is found that Ye light having a good level of reproduction performance can be generated by synthesizing the light of R2 and G2 having the wavelength relatively close to Ye in the emission spectrum compared to the wavelength of the light of R1 and G1. The wavelength of light of each R2 and G2 is also close to the wavelength of red (R) and green (G) emission spectrum of a high-pressure mercury vapor lamp used as a light source of a DLP projector. The spectral characteristics of R2, G2 and B shown in FIG. 2 can be expressed as a color triangle as shown in FIG. 3 using the coordinates corresponding to R2, G2 and B as the tops of the color triangle. Therefore, when generating non-primary color such as an image of Ye (yellow), which is a non-primary color between red (R) and green (G), the light having the wavelength for R2 and G2 respectively emitted from the second red LED 130 and the second green LED 140 can be preferably used.

Further, the ratio of light intensities of light emitted from each of the light sources, which is defined R1/R2 and G1/G2, can be changed depending on image signals input to the image projection apparatus 1.

Figure 4:
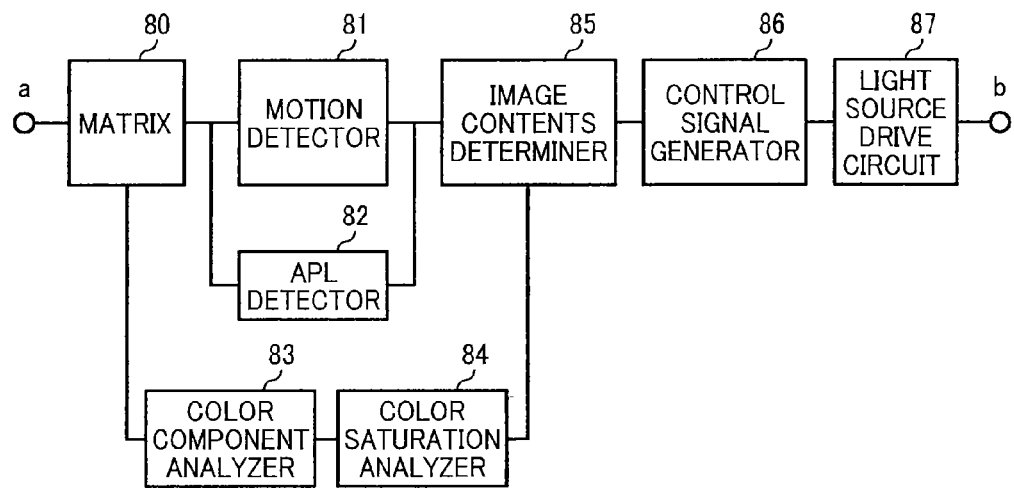
FIG. 4 is a block diagram of a circuit for generating signals for controlling a ratio of light intensities for R1/R2 and G1/G2.

FIG. 4 is a block diagram of a circuit for generating signals to control the ratio of light intensities of R1/R2 and G1/G2. In this block diagram, a signal is input from a terminal a, and then processed towards a terminal b. The circuit shown in FIG. 4 can be included in the main controller 50 such as a processing circuit. The control signal may be generated using a route different from a route for image signal to be displayed by the image projection apparatus 1.

The signals to control the ratio of light intensities of R1/R2 and G1/G2 can be generated as follows. An image signal is input from the terminal "a" and then separated into a luminance signal and a color component signal by a matrix 80 used as a signal separator.

A motion detector 81, used as an image determiner, monitors a plurality of image frames to determine whether an image signal is a moving image or a still image. Further, as for the luminance signal, an average picture level (APL) detector 82 used as an average luminance level detector detects a luminance level of the image signal. As for the color component signal, a color component analyzer 83 used as a color profile analyzer analyzes color profile of image based on the color component signal. For example, the color component analyzer 83 analyzes colors from green (G) to red (R) for the image projection apparatus 1. Further, a color saturation analyzer 84 used as a color saturation analyzer analyzes color saturation level or density level of color of image. Further, an image contents determiner 85 used as an image contents determiner determines what image is displayed based on information of the moving image and/or still image and the APL level information extracted from the luminance signal, and color component information and saturation level information extracted from the color component signal. Then, the image contents determiner 85 determines the contents using a following determination matrix.

For example, the determination matrix can be set as follows. If the image is determined having conditions of still image, high APL, and high saturation, the image is determined as "presentation type image," which may be created as an image used for presentation purpose. If the image is determined having conditions of moving image (or still image), low APL, and low saturation, the image is determined as a "natural object image" such as photo, moving image, which may be an image of actual objects taken by a camera or the like.

If it is determined that an image is the presentation type image based on the above mentioned determination matrix, the light of each R1, R2, G1 and G2 is emitted with a substantially full power. In contrast, if it is determined that an image is a natural object image based on the determination matrix, the ratio of light intensities of R1/R2 and G1/G2 are variably controlled based on an analysis of color component.

For example, if the natural object image is a green object on a mountain, the light intensity of the light of G1 and G2 can be controlled by setting the intensity relationship of G1>G2. Further, for example, if the natural object image is tinted autumnal leaves of yellow green and yellow, the light intensity of the light of G1 and G2 can be controlled by setting the intensity relationship of G1<G2 and R1<R2. In this process, an image signal is analyzed to determine components in signals. Specifically, based on the analysis of the image signal, signal components close to R/G primary colors and signal components close to Ye color, which can be generated by synthesizing the light of R and G, can be determined, and then the ratio of light intensities of R1/R2 and G1/G2 can be variably set.

Then, a control signal generator 86 generates the above-described control signal, and a light source drive circuit 87 converts the control signal to a signal that sets light ON of the light source, and controls the light source by transmitting the signal through the terminal b.

Comparison Example 1

Figure 5:
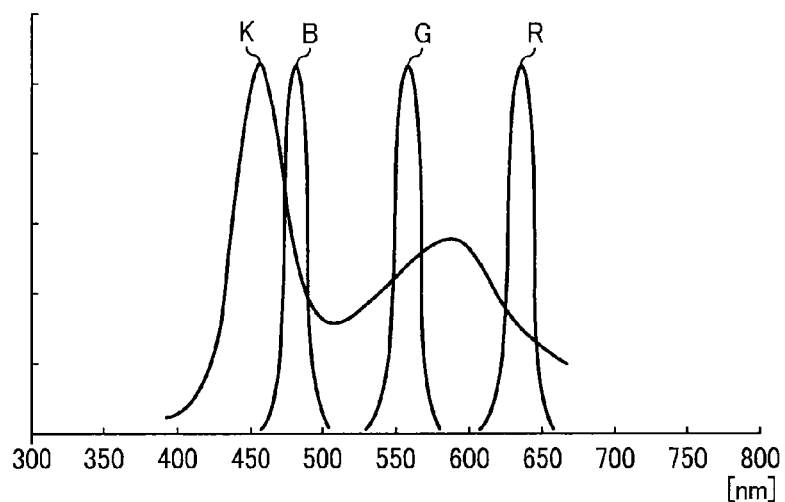
FIG. 5 shows an example emission spectrum of a high-pressure mercury vapor lamp of a comparison example and wavelength of primary colors of RGB.
Figure 6:
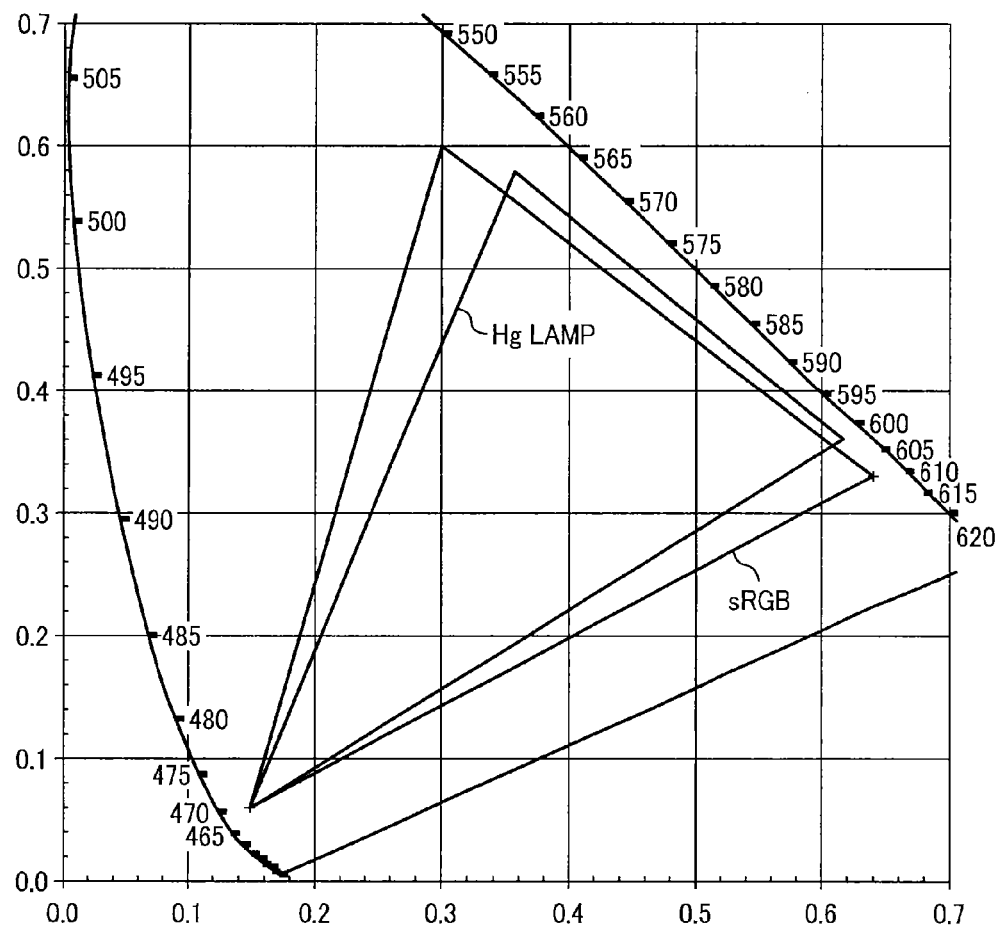
FIG. 6 shows color coordinates of primary color lights of the high-pressure mercury vapor lamp used as a light source of a projector having the emission spectrum of FIG. 5 plotted on the xy chromaticity diagram of CIE-XYZ color system compared with the color coordinates of primary color lights of sRGB.

FIG. 5 shows a profile of emission spectrum a high-pressure mercury vapor lamp (see profile K) of a comparison example 1 and the wavelengths of primary colors of RGB, and FIG. 6 shows color coordinates of light emitted from the high-pressure mercury vapor lamp having the emission spectrum of FIG. 5 on the xy chromaticity diagram of CIE-XYZ color system, wherein the high-pressure mercury vapor lamp is used as a light source of projectors.

As illustrated in a comparison example of FIG. 5, the emission spectrum of the high-pressure mercury vapor lamp is indicated by profile K in FIG. 5. In the profile K, the light intensity at the wavelength of each of RGB primary color lights is not uniform. Because typical projectors demand a given level of brightness, a wavelength used as the primary color of the high-pressure mercury vapor lamp may be shifted from the wavelength of primary color of the sRGB in view of the emission spectrum of the high-pressure mercury vapor lamp. As shown in the chromaticity diagram of FIG. 6, an outer color triangle is a color triangle having the top coordinates of primary color of sRGB, and an inner color triangle is a color triangle for the high-pressure mercury vapor lamp used as the light source of projectors.

As for the projectors using the high-pressure mercury vapor lamp as the light source, the wavelength of green (G) light of the high-pressure mercury vapor lamp that contributes greatly for the brightness is set with a wavelength which is shifted to a short side compared to the wavelength of primary color of sRGB standard, and further, the wavelength of red (R) of the high-pressure mercury vapor lamp is set with a wavelength which is shifted to a long side from the wavelength of primary color of sRGB standard to maintain the reproduction performance of brightness and colors. However, the color coordinates of R and G primary colors set for the high-pressure mercury vapor lamp are deviated from the color coordinates of R and G primary colors of the color reproduction range of sRGB standard, and thereby when G and R of the high-pressure mercury vapor lamp are displayed as a single color, G light may become a color of dead grass, and R light may become vermilion color.

Comparison Example 2

Figure 7:
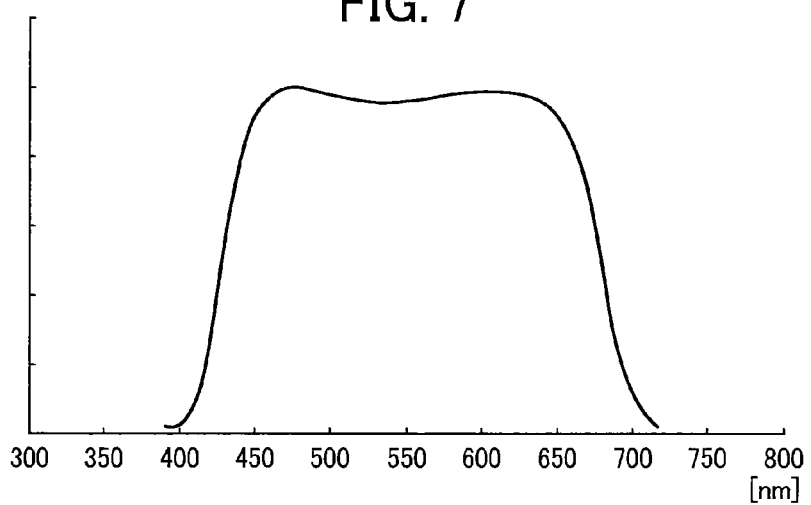
FIG. 7 shows a profile of emission spectrum of a xenon lamp of a comparison example.

FIG. 7 shows a profile of emission spectrum of a xenon lamp, which is a comparison example 2. The xenon lamp has an emission spectrum very close to the emission spectrum of the sunlight. Because the emission spectrum is relatively flat in the visible light range, the color reproduction performance is good at any colors having different wavelength, by which a good level of natural color reproduction performance can be obtained. However, because the xenon lamp is large and consumes high power, the xenon lamp may not be used as the light source of typical compact projectors.

In the above described example embodiment, the light source apparatus 10 includes the red light emitting device such as the first red LED 100 to emit red light, the green light emitting device such as the first green LED 110 to emit green light, the blue light emitting device such as the first blue LED 120 to emit blue light, which are independent light emitting devices with each other. Further, at least two light emitting devices of the red light emitting device, the green light emitting device, and the blue light emitting device include the first light source to emit the light of the primary color (e.g., first red LED 100, first green LED 110), and the second light source to emit the light having a wavelength deviated from the wavelength of the light of the primary color (e.g., second red LED 130, second green LED 140).

With this configuration, as described above, at least the two light emitting devices of the red light emitting device, the green light emitting device, and the blue light emitting device can emit the primary color light and a light having a wavelength deviated from the primary color light, by which at least two types of light can be used for two lights selected from red, green, and blue lights. Further, because the wavelength range of light emitted from the two light emitting devices (e.g., first red LED 100/second red LED 130, first green LED 110/second green LED 140) is broader compared to only emitting light of the primary color light, the color reproduction performance of non-primary color between the red, green, and blue can be enhanced.

In the above described light source apparatus 10 when each of the two light emitting devices includes the first light source (100, 110) and the second light source (130, 140), and when coordinates of wavelength of the red light emitting device (100, 130), the green light emitting device (110, 140) and the blue light emitting device (120) are plotted in a color coordinate system, two coordinates corresponding to two wavelength of the light emitted from the second light sources (130, 140) are between two coordinates corresponding to two wavelength of light emitted from the first light sources (100, 110), and the two coordinates corresponding to two wavelength of the light emitted from the second light sources (130, 140) are substantially on a line connecting the two coordinates of the light emitted from the first light sources (100, 110). With this configuration, as described above, each wavelength of the second light source of the two light emitting devices can be set close to a wavelength of non-primary color, by which the color reproduction performance of non-primary color can be enhanced.

In the above described light source apparatus 10 each of the first light sources (100, 110) of the at least two light emitting devices is a semiconductor light source that emits primary color light matched to sRGB standard of CIE-XYZ color system. With this configuration, as described above, in contrast to conventional high-pressure mercury vapor lamps which are difficult to emit a light having the wavelength of the primary color of sRGB standard, the semiconductor light source can select a wavelength of emitting light, and thereby the semiconductor light source can emit a light having the wavelength of the primary color of sRGB standard.

In the above described light source apparatus 10, each of the second light sources (130, 140) of the at least two light emitting devices emits light having a wavelength deviated from the wavelength of primary color light emitted by the first light sources (100, 110) in a range from 1 nm to 20 nm. With this configuration, as described above, the wavelength range of the light source can be broaden within a range of 1 nm to 20 nm, by which the color reproduction performance of non-primary color can be enhanced.

The above described light source apparatus 10 can be employed for the image projection apparatus 1. The image projection apparatus includes the light source apparatus 10, the light modulation element 30 to pass through or reflect light irradiated from the light source apparatus based on an image signal of a projection target image; and a projection optical system 40 to project an image passing through or reflecting the light modulation element on a screen. With this configuration, as described above, the color reproduction performance of non-primary color can be enhanced while maintaining luminance of projected image.

The image projection apparatus 1 includes a signal separator 80 to separate an image signal of the projection target image into a luminance signal and a color component signal; an image determiner 81 to determine whether the image is a moving image or a still image based on the luminance signal; an average luminance level detector 82 to detect an average luminance level of the image based on the luminance signal; a color profile analyzer 83 to analyze color profile based on the color component signal; a color saturation analyzer 84 to analyze color saturation based on the color component signal; an image contents determiner 85 to determine contents of the projection target image based on determination of the image determiner 81, determination of the average luminance level detector 82, analysis of the color profile analyzer 83, and analysis of the color saturation analyzer 84; an light intensity ratio determiner 86 to determine light intensity ratio of light emitted from the first light source and light emitted from the second light source based on the determination of the image contents determiner 85; and a light source controller (87) to control the first light sources and the second light sources based on the light intensity ratio determined by the light intensity ratio determiner 86. With this configuration, as described above, based on signals of a projection target image, signal components close to primary colors and signal components close to non-primary colors can be analyzed, and then a ratio of light intensities between the light emitted from light the first light source and the light emitted from the second light source can be determined depending on the analysis of signal components of colors. Therefore, depending on types of projection target image, the light source apparatus 10 can be controlled effectively.

In the image projection apparatus 1, the light source controller 87 controls a ratio of an emission time of light emitted from the first light source to an emission time of light emitted from the second light source, radiated to the light modulation element for one frame image, based on the light intensity ratio determined by the light intensity ratio determiner 86.

With this configuration, as described above, the ratio of emission time of light emitted from the first light source to an emission time of light emitted from the second light source can be computed based the analysis of luminance of image signal and color components of the input image, and thereby colors can be generated efficiently, and the color reproduction performance can be enhanced.

In the above described light source apparatus and the image projection apparatus employing the light source apparatus, among the red light emitting device, the green light emitting device and the blue light emitting device, at least each of two light emitting devices including a first light source (100, 110) and a second light source (130, 140), in which the first light source (100, 110) emitting light of primary color having a wavelength, and the second light source (130, 140) emitting light having a wavelength deviated from the wavelength of the light of the primary color. With this configuration, two types of light can be secured for at least two of red, green, and blue light. Further, because the wavelength range of light emitted from the two light emitting devices (e.g., first red LED 100/second red LED 130, first green LED 110/second green LED 140) is broader compared to only emitting light of the primary color light, the color reproduction performance of non-primary color between the red, green, and blue can be enhanced, color reproduction performance of non-primary color between red, green, and blue can be enhanced.

Numerous additional modifications and variations are possible in light of the above teachings. It is therefore to be understood that, within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:
1. An image projection apparatus comprising:
a light source apparatus including
a red light emitting device to emit red light;
a green light emitting device to emit green light; and
a blue light emitting device to emit blue light, each of the red light emitting device, the green light emitting device, and the blue light emitting device disposed separately from any other,
at least two of the light emitting devices each including a first light source emitting light having a wavelength of a light of a primary color, and a second light source emitting light having a wavelength deviated from the wavelength of the light of the primary color emitted from the first light source;
a light modulation element to pass through or reflect light irradiated from the light source apparatus based on an image signal of a projection target image;
a projection optical system to project an image passing through or reflected by the light modulation element on a screen;
a signal separator to separate an image signal of the projection target image into a luminance signal and a color component signal;
an image determiner to determine whether the image is a moving image or a still image based on the luminance signal;

an average luminance level detector to detect an average luminance level of the image based on the luminance signal;

a color profile analyzer to analyze color profile based on the color component signal;

a color saturation analyzer to analyze color saturation based on the color component signal;

an image contents determiner to determine contents of the projection target image based on determination of the image determiner, determination of the average luminance level detector, analysis of the color profile analyzer, and analysis of the color saturation analyzer;

a light intensity ratio determiner to determine light intensity ratio of light emitted from the first light sources and light emitted from the second light sources based on the determination of the image contents determiner; and a light source controller to control the first light sources and the second light sources based on the light intensity ratio determined by the light intensity ratio determiner.

2. The image projection apparatus of claim 1, wherein the light source controller controls a ratio of an emission time of light emitted from the first light sources to an emission time of light emitted from the second light sources radiated onto the light modulation element for one frame image, based on the light intensity ratio determined by the light intensity ratio determiner.

* * * * *